(12) United States Patent
Bar-Ness et al.

(10) Patent No.: US 8,144,723 B2
(45) Date of Patent: Mar. 27, 2012

(54) METHOD AND SYSTEM FOR STABLE THROUGHPUT OF COGNITIVE RADIO

(75) Inventors: Yeheskel Bar-Ness, Marlboro, NJ (US); Osvaldo Simeone, Hoboken, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1081 days.

(21) Appl. No.: 12/001,480

(22) Filed: Dec. 11, 2007

(65) Prior Publication Data

US 2008/0160927 A1 Jul. 3, 2008

Related U.S. Application Data

(60) Provisional application No. 60/874,145, filed on Dec. 11, 2006.

(51) Int. Cl.
*H04L 12/413* (2006.01)

(52) U.S. Cl. ........ 370/445; 370/310.2; 370/328; 370/331; 370/349; 370/412; 370/447; 370/450; 370/454; 370/459; 455/422.1; 455/512; 455/527; 455/528

(58) Field of Classification Search .......... 370/310.2, 370/328, 329–339, 349, 412–418, 445, 447, 370/450, 454, 456, 459; 455/422.1, 512, 455/527, 528

See application file for complete search history.

(56) References Cited

U.S. PATENT DOCUMENTS

| | | | |
|---|---|---|---|
| 2004/0131025 A1* | 7/2004 | Dohler et al. | 370/328 |
| 2005/0058153 A1* | 3/2005 | Santhoff et al. | 370/466 |
| 2006/0056457 A1* | 3/2006 | Livet et al. | 370/475 |
| 2006/0084444 A1* | 4/2006 | Kossi et al. | 455/450 |
| 2007/0086512 A1* | 4/2007 | Can et al. | 375/148 |
| 2007/0177538 A1* | 8/2007 | Christensen et al. | 370/328 |

OTHER PUBLICATIONS

International Preliminary Report on Patentability for PCT/IB2007/004052, issued Jun. 16, 2009.
Examination Report for Great Britain Application GB0911630.2, mailed Oct. 15, 2010.
Communication from the European Patent Office for EP Application 07 859 156.7, dated Oct. 9, 2009.
R.M. Loynes, "The Stability of a Queue with Non-Independent Inter-Arrival and Service Times", *Proceedings of the Cambridge Philosophical Society, Mathematical and Physical Sciences*, Cambridge, the University Press, vol. 58, pp. 497-520, 1962.
R. R. Rao and A. Ephremides, "On the Stability of Interacting Queues in a Multi-Access System", *IEEE Transactions on Information Theory*, vol. 34, No. 5, pp. 918-930, Sep. 1988.

(Continued)

*Primary Examiner* — Aung S Moe
*Assistant Examiner* — Hoon J Chung

(57) ABSTRACT

In one embodiment, a cognitive radio system includes a first transmitter in communication with a first receiver via a wireless channel. The first transmitter receives a plurality of first packets, and transmits the first packets to the first receiver via the channel. A second transmitter in communication with a second receiver and the first receiver via the channel receives a plurality of second packets, receives the plurality of first packets from the first transmitter, and transmits the second packets to the second receiver via the channel. The second transmitter is configured to detect an idle state of the channel. Upon detecting the idle state of the channel, the second transmitter is configured selectively to transmit at least one of the second packets to the second receiver or to relay at least one of the first packets to the first receiver.

18 Claims, 7 Drawing Sheets

OTHER PUBLICATIONS

W. Luo and A. Ephremides, "Stability of $N$ Interacting Queues in Random-Access Systems", *IEEE Transactions on Information Theory*, vol. 45, No. 5, pp. 1579-1587, Jul. 1999.

J. Neel, et al., "The Role of Game Theory in the Analysis of Software Radio Networks", *Proceeding of the SDR 02 Technical Conference and Product Exposition*, 2002.

A. Sahai et al., "Some Fundamental Limits on Cognitive Radio", *Proc. Allerton Conference on Communication, Control and Computing*, pp. 1662-1671, Oct. 2004.

C. Cordeiro et al., "IEEE 802.22: The First Worldwide Wireless Standard Based on Cognitive Radios", *Proc. IEEE DySPAN*, pp. 328-337, 2005.

G. Ganesan and Y. Li, "Cooperative Spectrum Sensing in Cognitive Radio Networks", *Proc. DySPAN*, pp. 137-143, 2005.

S. A. Jafar and S. Srinivasa, "Capacity Limits of Cognitive Radio with Distributed and Dynamic Spectral Activity", preprint (available online at http://arxiv.org/abs/cs.IT/0509077), 2005.

K. Lee and A. Yener, "On the Achievable Rate of Three-Node Cognitive Hybrid Wireless Networks", *Proc. International Conference on Wireless Networks, Communications and Mobile Computing*, vol. 2, pp. 1313-1318, 2005.

Q. Zhao et al., "Decentralized Cognitive MAC for Dynamic Spectrum Access", *Proc. DySPAN*, pp. 224-232, 2005.

S. Haykin, "Cognitive Radio: Brain-Empowered Wireless Communications", *IEEE Journal on Selected Areas in Communications*, vol. 23, No. 2, Feb. 2005.

Sharif and B. Hassibi, "On the Capacity of MIMO Broadcast Channels with Partial Side Information", *IEEE Transactions on Information Theory*, vol. 51, No. 2, pp. 506-533, Feb. 2005.

S. M. Mishra et al., "Cooperative Sensing Among Cognitive Radios", *Proc. IEEE ICC 2006*, pp. 1658-1663, 2006.

A. Sadek et al., "Cooperative Multiple Access for Wireless Networks: Protocols Design and Stability Analysis", *Proc. CISS, IEEE 2006*, pp. 1224-1229, 2006.

Y. Xing et al., "Dynamic Spectrum Access in Open Spectrum Wireless Networks", *IEEE Journal on Selected Areas in Communications*, vol. 24, No. 3, pp. 626-637, Mar. 2006.

P. Mitran et al., "On Compound Channels With Side Information at the Transmitter", *IEEE Transactions on Information Theory*, vol. 52, No. 4, pp. 1745-1755, Apr. 2006.

N. Devroye et al., "Achievable Rates in Cognitive Radio Channels", *IEEE Transactions on Information Theory*, vol. 52, No. 5, pp. 1813-1827, May 2006.

A. Jovičić and P. Viswanath, "Cognitive Radio: An Information-Theoretic Perspective", submitted (available online: http://lanl.arxiv.org/PS_cache/cs/pdf/0604/0604107.pdf) Jan. 14, 2008.

International Search Report for PCT counterpart, PCT/IB2007/004052, mailed Jun. 25, 2008.

\* cited by examiner

METHOD AND SYSTEM FOR STABLE THROUGHPUT OF COGNITIVE RADIO

CROSS-REFERENCE TO RELATED PATENT APPLICATIONS

The present application relates to U.S. Provisional Patent Application 60/874,145, filed on Dec. 11, 2006, and entitled "Method and System for a Stable Throughput of Cognitive Radio with Relaying Capabilities," which is incorporated herein in its entirety and forms a basis for a claim of priority.

FIELD

Embodiments of the present application relate to the field of cognitive radio principle for communication systems. Exemplary embodiments relate to a method and system for providing a stable throughput of cognitive radio with relaying capabilities.

BACKGROUND

Based on the evidence that fixed (licensed) spectrum allocation entails a highly inefficient resource utilization, cognitive radio prescribes the coexistence of licensed (or primary) and unlicensed (secondary or cognitive) radio nodes on the same bandwidth. While the first group is allowed to access the spectrum any time, the second seeks opportunities for transmission by exploiting the idle periods of primary nodes, as described in more detail in S. Haykin, "Cognitive radio: brain-empowered wireless communications," IEEE Journal on Selected Areas Commun., vol. 23, no. 2, pp. 201-220, February 2005, the entire content of which is incorporated herein by reference. The main requirement is that the activity of secondary nodes should be "transparent" to the primary, so as not to interfere with the licensed use of the spectrum.

Centralized and decentralized protocols at the media access control (MAC) layer that enforce this constraint have been studied in Y. Chen, Q. Zhao and A. Swami, "Joint design and separation principle for opportunistic spectrum access," in Proc. Asilomar Conf. on Signals, Systems and Computers, 2006, and Y. Xing, R. Chandramouli, S. Mangold and S. Shankar N, "Dynamic spectrum access in open spectrum wireless networks," IEEE Journ. Selected Areas Commun., pp. 626-637, vol. 24, no. 3, March 2006, the entire contents of which are incorporated herein by reference. Here, the radio channel is modeled as either busy (i.e., the primary user is active) or available (i.e., the primary user is idle) according to a Markov chain. Information theoretic study of cognitive radios at the physical layer that take into account the asymmetry between primary and secondary users are presented in: N. Devroye, P. Mitran and V. Tarokh, "Achievable rates in cognitive radio," IEEE Trans. Inform. Theory, vol. 52, no. 5, pp. 1813-1827, May 2006; A. Jovicic and P. Viswanath, "Cognitive radio: an information-theoretic perspective," available on-line at http://lanl.arxiv.org/PS_cache/cs/pdf/0604/0604107.pdf; S. A. Jafar and S. Srinivasa, "Capacity limits of cognitive radio with distributed and dynamic spectral activity," preprint [http://arxiv.org/abs/cs.IT/0509077]; and Kyounghwan Lee and A. Yener, "On the achievable rate of three-node cognitive hybrid wireless networks," in Proc. International Conference on Wireless Networks, Communications and Mobile Computing, vol. 2, pp. 1313-1318, 2005, the entire contents of all of which are incorporated herein by reference. Alternatively, game theory has been advocated as an appropriate framework to study competitive spectrum access in cognitive networks in J. Neel, J. Reed, R. Gilles, "The Role of Game Theory in the Analysis of Software Radio Networks," in Proc. SDR Forum Technical Conference, 2002, the entire content of which is incorporated herein by reference. Finally, the concept of cognitive radio has been embraced by the IEEE 802.22 Working Group, that is working towards the definition of a Wireless Regional Area Network standard for secondary use of the spectrum that is currently allocated to television service, as described in more detail in C. Cordeiro, K. Challapali, D. Birru and Sai Shankar N, "IEEE 802.22: the first worldwide wireless standard based on cognitive radio", in Proc. IEEE DySPAN, pp. 328-337, 2005, the entire content of which is incorporated herein by reference.

A cognitive network where two source-destination links, a primary link and a secondary link, share the same spectral resource (for example, a cognitive interference channel, as shown in FIG. 1) has been recently investigated in the landmark paper by Devroye et al. and in Jovicic et al. from an information theoretic standpoint. In these references, a cognitive transmitter is assumed to have perfect prior information about the signal transmitted by a primary transmitter (see also P. Mitran, N. Devroye and V. Tarokh, "On compound channels with side information at the transmitter," IEEE Trans. Inform. Theory, vol. 52, no. 4, pp. 1745-1755, April 2006, the entire content of which is incorporated herein by reference). However, imperfect information on the radio environment (e.g., on the primary activity) at the cognitive transmitter (or node) is expected to be a major impediment to the implementation of the cognitive principle, as described in more detail in A. Sahai, N. Hoven and R. Tandra, "Some fundamental limits on cognitive radio," in Proc. Allerton Conference on Communication, Control, and Computing, October 2004, the entire content of which is incorporated herein by reference. Moreover, traffic dynamics at the primary are of great importance in defining the performance of cognitive radio, but random packet arrival cannot be easily incorporated in a purely information theoretic analysis.

SUMMARY

Aspects of the exemplary embodiments are directed to increasing an average throughput of a secondary link of a cognitive radio system and ensuring stability of the system.

In one embodiment, a cognitive radio system includes: a first transmitter in communication with a first receiver via a wireless channel, for receiving a plurality of first packets, and for transmitting the first packets to the first receiver via the channel; and a second transmitter in communication with a second receiver and the first receiver via the channel, for receiving a plurality of second packets, for receiving the plurality of first packets from the first transmitter, and for transmitting the second packets to the second receiver via the channel. The second transmitter is configured to detect an idle state of the channel. Upon detecting the idle state of the channel, the second transmitter is configured selectively to transmit at least one of the second packets to the second receiver or to relay at least one of the first packets to the first receiver.

The second transmitter may be configured selectively to transmit the at least one of the second packets or to relay the at least one of the first packets based on a detected state of a transmission of the at least one of the first packets to the first receiver from the first transmitter.

The second transmitter may be configured to relay the at least one of the first packets if the transmission of the at least one of the first packets is detected to be unsuccessful.

The second transmitter may be configured to refrain from relaying the at least one of the first packets if the transmission of the at least one of the first packets is detected to be successful.

The first transmitter may be configured to acknowledge an acceptance of the at least one of the first packets by the second transmitter.

After the first transmitter has transmitted at least one of the first packets, the first transmitter may be configured to refrain from re-transmitting the at least one of the first packets if the transmission of the at least one of the first packets is detected to be unsuccessful and the first transmitter has acknowledged the acceptance of the at least one of the first packets by the second transmitter.

The second transmitter may have a transmission power, and the second transmitter may be configured to ensure a service stability of the first transmitter by controlling the transmission power.

The second transmitter may be configured to ensure a service stability of the first transmitter in selectively transmitting the at least one of the second packets to the second receiver or relaying the at least one of the first packets to the first receiver.

The first transmitter may correspond to a licensed user of the channel and the second transmitter corresponds to an unlicensed user of the channel.

In another embodiment, a method of operating a cognitive radio system includes: directing a plurality of first packets to a first transmitter for transmission to a first receiver over a wireless channel, and to a second transmitter; directing a plurality of second packets to the second transmitter for transmission to a second receiver over the channel; transmitting at least one of the first packets from the first transmitter to the first receiver; detecting at the second transmitter an idle state of the channel; and, upon the detection of the idle state of the channel, selectively transmitting at least one of the second packets from the second transmitter to the second receiver or relaying the at least one of the first packets from the second transmitter to the first receiver.

The step of selectively transmitting the at least one of the second packets or relaying the at least one of the first packets may be based upon a detected state of the transmission of the at least one of the first packets to the first receiver.

The first transmitter may correspond to a licensed user of the channel and the second transmitter corresponds to an unlicensed user of the channel.

DETAILED DESCRIPTION

Embodiments described herein relate to a scenario with two single-user links, one licensed to use the spectral resource (primary) and one unlicensed (secondary or cognitive). According to the cognitive radio principle, the activity of the secondary link is required not to interfere with the performance of the primary. Therefore, it is understood herein that the cognitive link accesses the channel only when sensed idle. Moreover, the exemplary embodiments consider: 1) random packet arrivals; 2) sensing errors due to fading at the secondary link; and 3) power allocation at a secondary transmitter based on long-term measurements. According to exemplary embodiments, the maximum stable throughput of the cognitive link (in packets/slot) is derived for a fixed throughput selected by the primary link.

According to another embodiment, the secondary transmitter is configured to act as a "transparent" relay for the primary link. In particular, packets that are not received correctly by the intended destination may be decoded successfully by the secondary transmitter. The latter can then queue and forward these packets to the intended receiver. Stable throughput of the secondary link with relaying may be derived under the same (or similar) conditions as noted above. As will be described in more detail below, certain features (or benefits) of relaying may depend on the topology (e.g., average channel powers) of the network.

Figure 1:
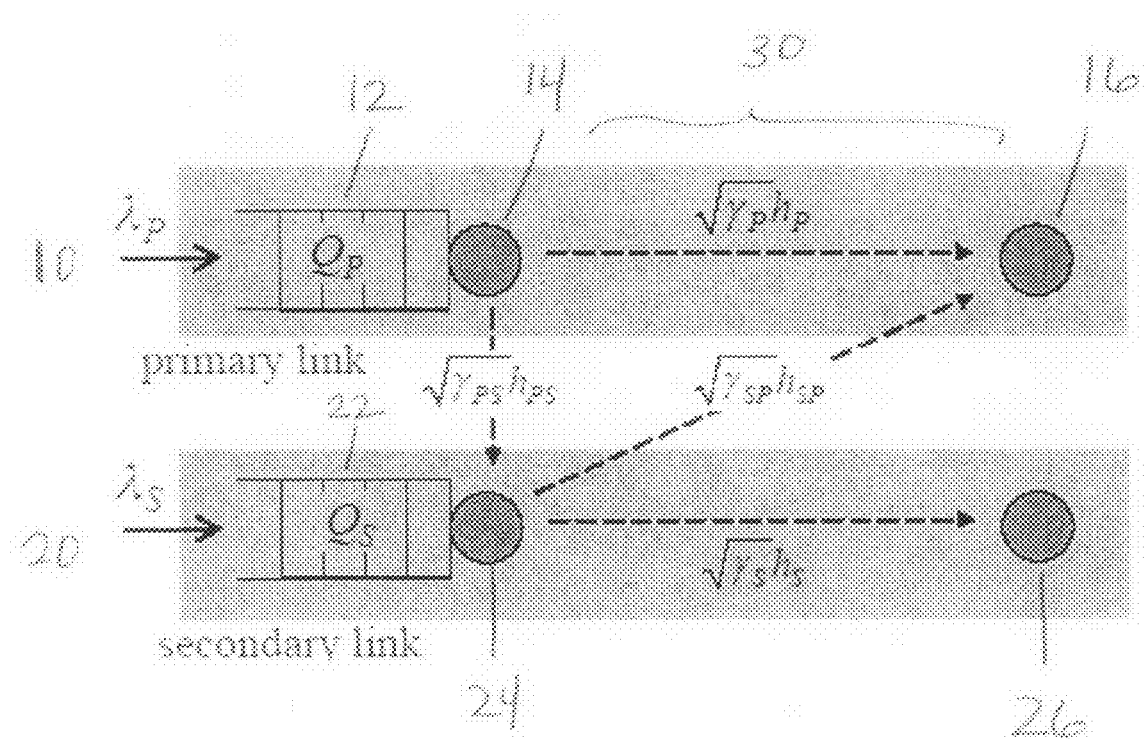
FIG. 1 is a diagram of a system configuration according to an exemplary embodiment.

In exemplary embodiments, the cognitive interference channel as shown in FIG. 1 is further explored by accounting for measurement errors relating to a primary transmitter 14 and random packet arrivals. In more detail, the primary transmitter 14 and a secondary transmitter 24 are equipped with respective queues 12, 22 of a certain size (e.g., an infinite size) and time is slotted. Here, it is understood that that the secondary transmitter (or node) 24 is able to infer the timing of the primary link from the received signal during the observation phase. At the beginning of each slot, the cognitive node 24 senses channel 30 and, if detected idle, transmits a packet (if it has any in queue 22). Detection of the primary activity may incur in (or encounter) errors due to impairments on the wireless fading channel 30, thus causing possible interference from the secondary link 20 to the primary link 10. Since the cognitive principle is based on the idea that the presence of the secondary link 20 should be "transparent" to the primary link 10, appropriate countermeasures (e.g., power control) is adopted at the secondary node 24. In exemplary embodiments, stability of the system (i.e., finiteness of the queues 12, 22 in the system at all times) is selected as the performance criterion of interest. In a further embodiment, given the average throughput selected independently by the primary transmitter 14, the maximum average throughput that the secondary link 20 can sustain while guaranteeing stability of the system is determined.

Figure 5:
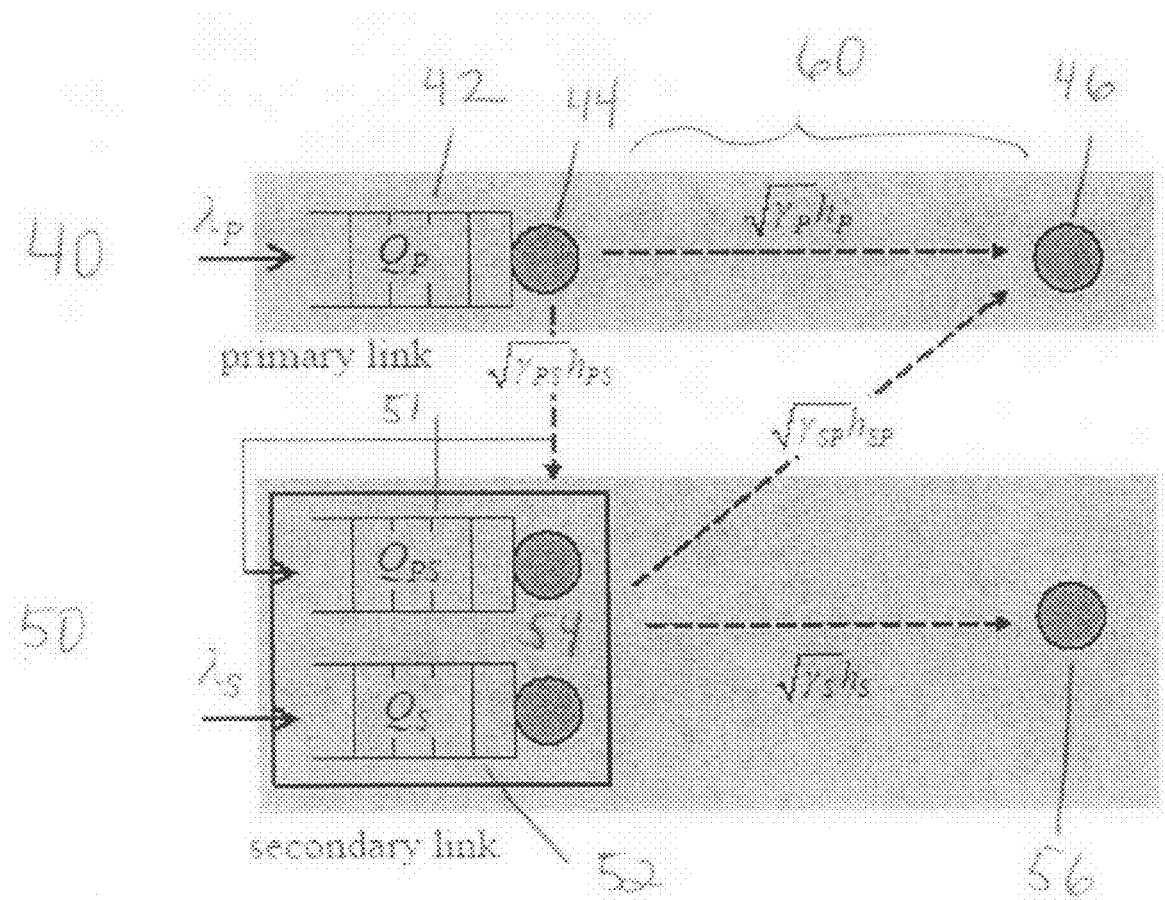
FIG. 5 is a diagram of a system configuration according to another exemplary embodiment.

In another embodiment, a secondary transmitter 54 provides a relaying capability (see, for example, FIG. 5). Here, the direct channel on the primary link 40 is weak (or weaker) with respect to the channel from the primary transmitter 44 to the secondary transmitter 54. In this case, having packets relayed by the secondary transmitter 54 can help emptying the queue 42 of the primary transmitter 44, thus creating transmitting opportunities for the secondary. According to a further embodiment, relaying of primary packets by the cognitive transmitter 54 increases the stable throughput of the secondary link 50 (for a fixed selected throughput of the primary link 40).

I. System Model

Referring back to FIG. 1, a single-link primary communication 10 is active and a secondary (cognitive) single link 20 is interested in employing the spectral resource 30 whenever available. The system encompasses both physical layer parameters and MAC dynamics as follows.

A. MAC Layer Model

Both primary and secondary transmitting nodes 14, 24 have a buffer 12, 22 of a certain capacity (e.g., an infinite capacity) to store incoming packets. Time is slotted and transmission of each packet takes one slot (all packets have the same number of bits). The packet arrival processes at each node are independent and stationary with mean $\lambda_P$ [packets/slot] for the primary user 14 and $\lambda_S$ [packets/slot] for the cognitive 24 (see FIG. 1). Due to impairments on the radio channel 30 (fading, for example), a packet can be received in error by the intended destination, which requires retransmission. Here, it will be appreciated by those skilled in the art that overhead for transmission of ACKnowledgement (ACK) and Not-ACKnowledgement (NACK) messages will also be present.

According to the cognitive principle, the primary link 10 employs the channel 30 whenever it has some packets to transmit in its queue 12. On the other hand, the secondary (cognitive) transmitter 24 senses the channel 30 in each slot and, if it detects an idle slot, transmits a packet (if there is any) from its queue 22. Here, the slot is sufficiently long so as to allow an appropriate detection time interval for the cognitive node 24. As discussed below, because of reception impairments due to fading, the secondary transmitter 24 may incur in (or encounter) errors while detecting the presence of the primary user 14. In another embodiment, as will be described in more detail below, the MAC layer will be configured to allow the secondary node to act as a relay for the primary user (see, for example, FIG. 5).

B. Physical Layer Model

With reference to FIG. 1, radio propagation between any pair of nodes is assumed to be affected by independent stationary Rayleigh flat-fading channels $h_i(t)$ with $E[|h_i(t)|^2]=1$ (t denotes time and runs over time-slots). Here, the cumulative distribution function of the instantaneous power $|h_i(t)|^2$ is $P[|h_i(t)|^2<x]=1-\exp(-x)$. The channel is constant in each slot (block-fading). The average channel power gain (due to shadowing and path loss) is denoted as $\gamma_i$, where i reads "P" for the primary connection, "S" for the secondary, "SP" for the channel between secondary transmitter and primary receiver and "PS" for the channel between primary transmitter and secondary transmitter.

In one embodiment, the primary node transmits with normalized power $P_P=1$ and, without loss of generality, the noise power spectral density at all receivers is also normalized to 1. The power transmitted by the secondary node (when active) is $P_S \leq 1$. In one embodiment, transmission of a given packet is considered successful if the instantaneous received signal-to-noise ratio (SNR) $\gamma_i|h_i(t)|^2 P_i$ is above a given threshold $\beta_i$, that is fixed given the choice of the transmission mode. Therefore, the probability of outage (unsuccessful packet reception) on the primary or secondary link reads (i equals "P" or "S")

$$P_{out,i} = P[\gamma_i|h_i(t)|^2 P_i < \beta_i] = 1 - \exp\left(-\frac{\beta_i}{\gamma_i P_i}\right). \quad (1)$$

In one embodiment, the primary and secondary links can employ transmission modes with different signal-to-noise ratio requirements, $\beta_P \neq \beta_S$.

The cognitive node is able to correctly detect the transmission of the primary user if the instantaneous SNR $\gamma_{PS}|h_{PS}|^2$ is larger than a threshold $\alpha$ (recall that $P_P=1$). It follows that the probability of error in the detection process is $$P_e = P[\gamma_{PS}|h_{PS}(t)|^2 < \alpha] = 1 - \exp\left(-\frac{\alpha}{\gamma_{PS}}\right). \quad (2)$$

Here, it is understood that whenever the secondary node is able to decode the signal of the primary, it is also able to detect its presence, i.e., $\alpha<\beta_P$. Moreover, it is understood that whenever the primary user is not transmitting, the secondary transmitter is able to detect an idle slot with zero probability of error (false alarm). This understanding is reasonable in the scenario at hand where interference from other systems is assumed to be negligible. As further detailed below, it will be appreciated by one skilled in the art that the analysis in the presence of a non-zero probability of false alarm follows from the disclosure presented herein.

C. Issues Analyzed

It is understood herein that the secondary transmitter is able to select its transmission power $P_S \leq 1$ based on the statistics of the channels ($\gamma_P$, $\gamma_S$, $\gamma_{PS}$, $\gamma_{SP}$) and the system parameters ($\alpha$, $\beta_P$, $\beta_S$, $\lambda_P$) towards the following two (potentially) conflicting goals: (i) making its activity "transparent" to the primary link (more details below); (ii) maximizing its own stable throughput. Two remarks are in order:

1. The "transparency" of the cognitive node to the primary user is here defined in terms of stability of the queue of the primary user. That is, as a result of the activity of the secondary, the primary node is guaranteed that its queue will remain stable. On the contrary, in certain embodiments, no constraints are imposed on the increase in the average delay experience by the primary. As such, certain embodiments are suitable for delay-insensitive applications;

2. The knowledge of the (average) channel parameters ($\gamma_P$, $\gamma_S$, $\gamma_{PS}$, $\gamma_{SP}$) is assumed at the cognitive transmitter. The premise here is that, in the assumed stationary fading scenario, the cognitive node will have enough time to infer these parameters during the observation phase of the cognitive cycle. Possible solutions to achieve this goal can build on collaboration with the secondary receiver in idle slots (for further information on cooperative detection in cognitive networks, see G. Ganesan and Y. Li, "Cooperative spectrum sensing in cognitive radio networks," in Proc. DySPAN, pp. 137-143, 2005 and S. M. Mishra, A, Sahai and R. W. Brodersen, "Cooperative sensing among cognitive radio," in Proc. IEEE ICC, 2006, the entire contents of which are incorporated herein by reference). In one embodiment, the system parameter $\beta_P$ is part of the prior knowledge available at the secondary link about the primary communication. Moreover, in a further embodiment, the throughput $\lambda_P$ selected by the primary link can be estimated by observing the fraction of idle slots, and measuring the ACK/NACK messages sent by the secondary receiver.

III. Stable Throughput of the Cognitive Node

The described embodiments below relate to the maximum throughput (i.e., average arrival rate) $\lambda_S$ that can be sustained by the secondary node for a given (fixed) throughput $\lambda_P$, provided that the system remains stable. In other words, the primary user selects its own arrival rate $\lambda_P$, ignoring the presence of a secondary node. It is then the task of the cognitive user to select its transmission mode (for example, the power $P_S$) in order to exploit as much as possible the idle slots left available by the primary activity while not affecting stability of the system.

Stability is defined as the state where all the queues in the system are stable. In one embodiment, a queue is said to be stable if and only if the probability of being empty remains nonzero for time t that grows to infinity:

$$\lim_{t \to \infty} P[Q_i(t) = 0] > 0, \tag{3}$$

where $Q_i(t)$ denotes the unfinished work (in packets) of the i th queue at time t. An alternative definition of stability is described in more detail in R. Rao and A. Ephremides, "On the stability of interacting queues in a multi-access system," IEEE Trans. Inform. Theory, vo. 34, pp. 918-930, September 1988, the entire content of which is incorporated herein by reference. If arrival and departure rates of a queuing system are stationary, then stability can be checked by using Loynes' theorem (see R. M. Loynes, "The stability of a queue with non-independent inter-arrival and service times," Proc. Cambridge Philos. Soc. 58, pp. 497-520, 1962, the entire content of which is incorporated herein by reference). Here, if the average arrival rate $\lambda_i$ is less than the average departure rate $\mu_i$, $\lambda_i < \mu_i$, then the i th queue is stable; on the other hand, if the average arrival rate $\lambda_i$ is greater than the average departure rate $\mu_i$, the queue is unstable; finally, if $\lambda_i = \mu_i$, the queue can be either stable or unstable. Whenever the Loynes' theorem is applicable, in one embodiment, the average departure rate $\mu_i$ is defined as the maximum stable throughput of the i th queue.

In more detail, the system from the point of view of the primary transmitter is considered. According to the cognitive principle, the primary link is unaware of the presence of a secondary node willing to use the bandwidth whenever available. Therefore, as far as the primary node is concerned, the system consists of a single queue (its own), characterized by a stationary departure rate (due to the stationarity of the channel fading process $h_P(t)$) with average $$\mu_P^{max} = 1 - P_{out,P} = \exp\left(-\frac{\beta_P}{\gamma_P}\right).$$

Moreover, by the Loynes' theorem, the rate $\mu_P^{max}$ is the maximum stable throughput as "perceived" by the primary user. In other words, the primary user is allowed to select any rate $\lambda_P$ that satisfies:

$$\lambda_P < \mu_P^{max} = \exp\left(-\frac{\beta_P}{\gamma_P}\right). \tag{4}$$

In a system without measurement errors, the cognitive link does not incur in (or encounter) any error while detecting the activity of the primary user. Therefore, it can access the channel in idle slots without causing any interference to the primary link, and the queues at the two transmitters are non-interacting. It follows that the departure rate at the secondary transmitter is stationary due to the stationarity of the channel process $h_S(t)$, and has average equal to $\mu_S^{max}(P_S) = (1-P_{out,S}) \cdot P[Q_P(t)=0]$. The second term in $\mu_S^{max}(P_S)$ enforces the constraint that the secondary node accesses the channel only when the primary does not have any packet in its queue. According to Little's theorem, $P[Q_P(t)=0] = 1 - \lambda_P / \mu_P^{max}$ which from Equation (1) yields $$\mu_S^{max}(P_S) = \exp\left(-\frac{\beta_S}{\gamma_S P_S}\right)\left(\frac{\mu_P^{max} - \lambda_P}{\mu_P^{max}}\right). \tag{5}$$

Therefore, in the case without measurement errors, the maximum throughput of the secondary link is achieved for transmitted power $P_S$ equal to its maximum, $P_S = 1$. Furthermore, it is a fraction of the "residual" throughput $(\mu_P^{max} - \lambda_P)/\mu_P^{max}$ left available by the activity of the primary link according to the probability of outage on the secondary link.

The cognitive node senses the channel at each slot and, if it measures no activity from the primary, it starts transmitting with power $P_S \leq 1$ (provided that there is at least one packet in queue). However, due to errors in the detection process, the secondary node starts (or may start) transmitting (with the same power $P_S$) even in slots occupied by the primary transmission with probability $P_e$ (see Equation (2)) (again, provided that there is at least one packet in its queue). This causes interference to the communication on the primary link, which in turns reduces the actual throughput of the primary. Here, it can be seen that the queuing systems of primary and secondary transmitters are interacting. Therefore, stationarity of the departure rates cannot (or may not) be guaranteed and the Loynes' theorem is not (or may not be) applicable (see Rao et al. and W. Luo and A. Ephremides, "Stability of interacting queues in random-access systems," IEEE Trans. Inform. Theory, vol. 45, no. 5, pp. 1579-1587, July 1999, the entire content of which is incorporated herein by reference).

Described in more detail below is the maximum power $P_S$ that the cognitive node is allowed to transmit in order to guarantee stability of the queue of the primary.

Proposition 1: Given the channel parameters $(\gamma_P, \gamma_{PS}, \gamma_{SP})$ and system parameters $(\alpha, \beta_P, \lambda_P)$:

if $\lambda_P \leq \mu_P^{max} \exp(-\alpha/\gamma_{PS})$, the secondary user can employ any power $P_S$ without affecting the stability of the queue of the primary node, and in a particular embodiment $P_S$ is set equal to its maximum, $P_S = 1$;

if $\mu_P^{max} \exp(-\alpha/\gamma_{PS}) \leq \lambda_P < \mu_P^{max}$, the maximum power that the cognitive node can employ is $$P_S < \left(\frac{\mu_P^{max} - \lambda_P}{\lambda_P - \mu_P^{max} \exp\left(-\frac{\alpha}{\gamma_{PS}}\right)}\right)^{\gamma_P/\beta_P} \frac{\gamma_P/\beta_P}{\gamma_{SP}}. \tag{6}$$

Due to the interaction between the queues at the primary and secondary transmitting nodes, the Loynes' theorem cannot be directly employed to investigate stability of the system. In order to overcome the above, a transformed system, referred to as dominant, is considered. This has the same stability properties as the original system and, at the same time, presents non-interacting queues. In the setting at hand, the dominant system can be constructed by modifying the original setting described herein as follows. If $Q_S(t)=0$, the secondary node transmits "dummy" packets whenever it senses an idle channel, thus continuing to possibly interfere with the primary user irrespective of whether its queue is empty or not. Following Luo et al., it can be shown that this dominant system is stable if and only if the original system is. In fact, on one hand, the queues of the dominant system have always larger size than the ones of the original system (thus if the dominant system is stable, the original is stable). On the other hand, under saturation, the probability of sending a "dummy" packet in the dominant system is zero and the two systems are indistinguishable (therefore, if the dominant system is unstable, the original is unstable). As described in more detail later, in the dominant system the departure rates are stationary processes, and thus Loynes' theorem is applicable to draw conclusions about the stability of the original system.

As a direct consequence of Proposition 1, the secondary can employ its maximum power $P_S = 1$ for $\lambda_P < \bar{\lambda}_P$ where $$\bar{\lambda}_P = \mu_P^{max}\left[\frac{\gamma_P/\beta_P + \exp\left(-\frac{\alpha}{\gamma_{PS}}\right)\gamma_{SP}}{\gamma_{SP} + \gamma_P/\beta_P}\right]. \quad (7)$$

Figure 2:
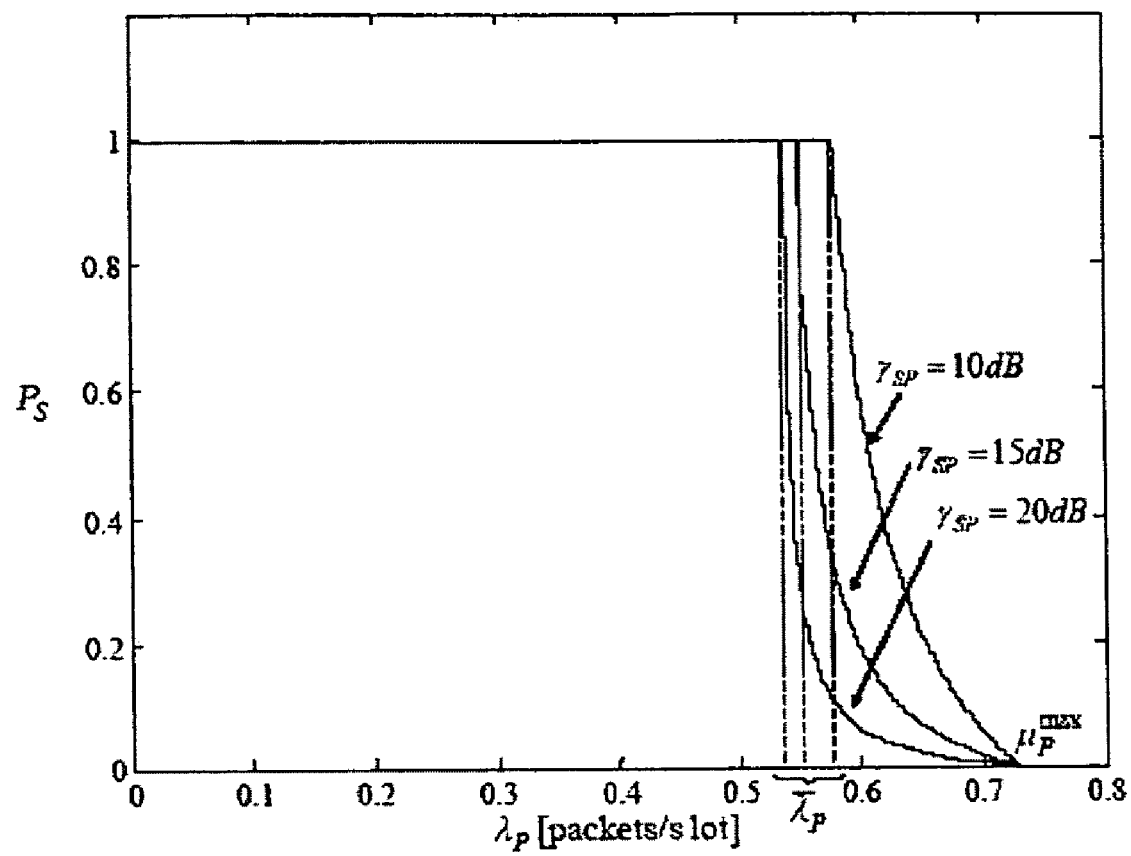
FIG. 2 is a graph showing a maximum power allowed to a secondary user versus an arrival rate to a primary user in the system configuration of FIG. 1.
Figure 3:
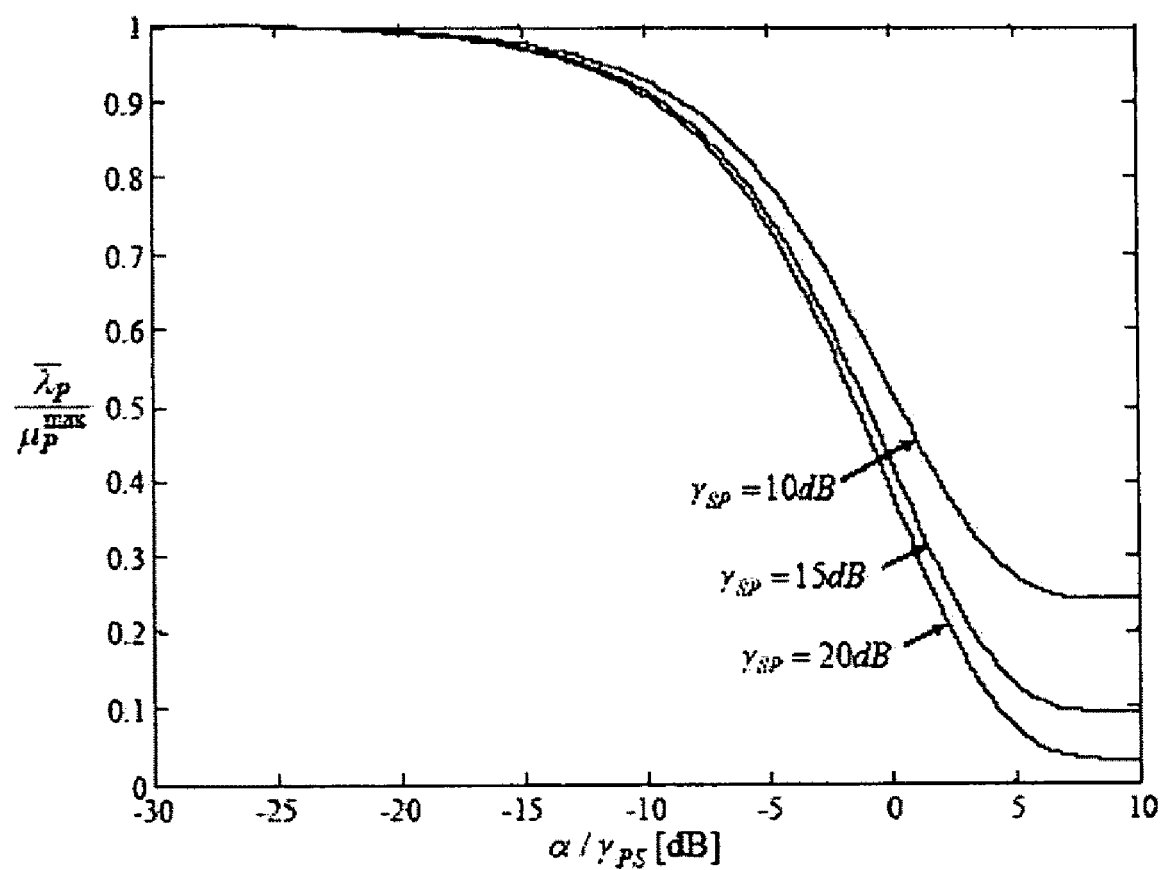
FIG. 3 is a graph showing a sensitivity of the average arrival rate to the primary user versus a detection error probability component in the system configuration of FIG. 1.

FIG. 2 shows the maximum power $P_S$ allowed to the secondary user (see Equation (6)) versus the throughput selected by the primary user $\lambda_P$ according to respective embodiments, wherein $\beta_P/\gamma_P = -5$ dB (which implies $P_{out,P} = 0.27$), $\gamma_P = 10$, 15, 20 dB and $\alpha/\gamma_{PS} = -5$ dB ($P_e = 0.27$). Here, a large value for probability $P_e$ is selected here, for example, to guarantee a better visualization of the results shown in FIG. 2. It will be appreciated by one skilled in the art that the performance of the scheme for other values of the parameters can be qualitatively inferred from the presented results. Here, the maximum rate that the primary user can select is $\mu_P^{max} = 0.73$ in Equation (4), and the primary rate $\bar{\lambda}_P$ in Equation (7) at which the secondary node has to reduce its power as compared to 1 reduces for increasing $\gamma_{SP}$. The sensitivity of $\bar{\lambda}_P$ to the detection error probability is shown in FIG. 3, where the ratio $\bar{\lambda}_P/\mu_P^{max}$ is plotted versus $\alpha/\gamma_{PS}$ again for $\gamma_{SP} = 10$, 15, 20 dB: for $P_e \to 1$ (increasing $\alpha/\gamma_{PS}$) this ratio tends to $\gamma_P/\beta_P/(\gamma_{SP}+\gamma_P/\beta_P)$, whereas for $P_e \to 0$ (decreasing $\alpha/\gamma_{PS}$) the ratio tends to 1 and the cognitive node is allowed to use its maximum power for any $\lambda_P$ in Equation (4).

The queuing process at the cognitive node will now be considered in more detail. Here, the original issue of deriving the maximum throughput sustainable by the secondary node under the constraint that the system is stable is addressed. As shown below, the issue reduces to an optimization over the transmitted power $P_S$ (under the constraint set forth in Proposition 1 above). In fact, there exists an inherent trade-off in the choice of $P_S$. On one hand, increasing $P_S$ increases the interference on the primary link, which limits the probability of transmission opportunities for the cognitive node: On the other, increasing $P_S$ enhances the probability of correct reception on the secondary link.

Proposition 2: Given the channel parameters ($\gamma_P$, $\gamma_S$, $\gamma_{PS}$, $\gamma_{SP}$) and system parameters ($\alpha$, $\beta_P$, $\beta_S$, $\lambda_P$), under the understanding that the stability of the queue of the primary user is preserved ("transparency" of the cognitive node), the maximum stable throughput of the cognitive user is obtained by solving the following optimization problem:

$$\max_{P_S} \mu_S(P_S) \quad (8)$$

$$\text{s.t.} \begin{cases} P_S \leq 1 & \text{if } \lambda_P \leq \bar{\lambda}_P \\ P_S < \left(\frac{\exp\left(-\frac{\beta_P}{\lambda_P}\right) - \lambda_P}{\lambda_P - \exp\left(-\frac{\alpha}{\gamma_{PS}} - \frac{\beta_P}{\gamma_P}\right)}\right)\frac{\gamma_P/\beta_P}{\gamma_{SP}} & \text{if } \lambda_P > \bar{\lambda}_P, \end{cases}$$

where the throughput of the secondary link reads $$\mu_S(P_S) = \quad (9)$$

$$\left(\frac{\gamma_{SP}P_S\left[\mu_P^{max}\exp\left(-\frac{\alpha}{\gamma_{PS}}\right) - \lambda_P\right] + \gamma_P/\beta_P[\mu_P^{max} - \lambda_P]}{\gamma_P/\beta_P + \exp\left(-\frac{\alpha}{\gamma_{PS}}\right)\gamma_{SP}P_S}\right) \cdot \frac{\exp\left(-\frac{\beta_S}{\gamma_S P_S}\right)}{\mu_P^{max}},$$

and $\bar{\lambda}_P$ is given by Equation (7). The optimization problem as set forth in Equation (8) requires a one-dimensional search and can be solved by using standard methods, such as those described in D. P. Bertsekas, Nonlinear programming, Athena Scientific, 2003, the entire content of which is incorporated herein by reference. Here, assuming a non-zero probability of false alarm $P_{fa}$ at the secondary (see Sec. II), it will be appreciated by one skilled in the art that a result is a scaling of the achievable throughput $\mu_S(P_S)$ in Equation (9) by $1-P_{fa}$. Further details regarding Proposition 2 above are presented later.

Figure 4A:
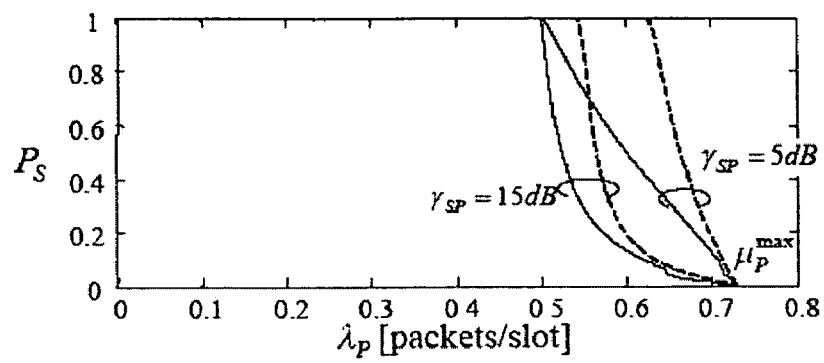
FIG. 4a is a graph showing upper bounds of a throughput-maximizing power allowed to the secondary user versus an arrival rate to the primary user in the system configuration of FIG. 1.
Figure 4B:
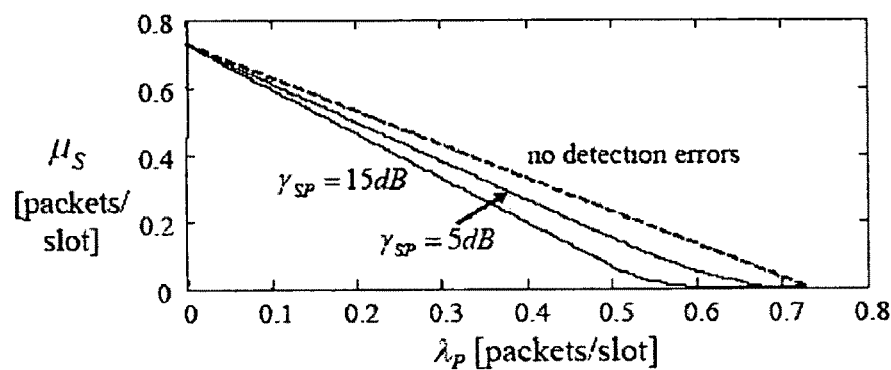
FIG. 4b is a graph showing a maximal throughput of the secondary user versus the arrival rate to the primary user in the network configuration of FIG. 1.

FIGS. 4a and 4b show the optimal transmitted power $P_S$ and the corresponding maximum throughput $\mu_S$ for the cognitive node versus the selected throughput of the primary user $\lambda_P$ in the same conditions as for FIGS. 2 and 3 ($\beta_P/\gamma_P = \beta_S/\gamma_S = -5$ dB, $\gamma_{SP} = 5$, 15 dB and $\alpha/\gamma_{PS} = -5$ dB). In particular, FIG. 4a shows both the upper bound (see Equation (6)) (dashed lines) and the throughput-maximizing power $P_S$, whereas FIG. 4b shows the corresponding maximum throughput $\mu_S$. As would be expected from Equation (9), the maximum throughput $\mu_S$ decreases linearly (or substantially linearly) with $\lambda_P$ as long as the optimal $P_S$ equals 1. For reference, the maximum stable throughput $\mu_S^{max}(1)$ in Equation (5) is shown, accounting for the case where no sensing errors occur at the cognitive link.

IV. Stability Throughput of a Cognitive Node with Relaying

Here, a modified version of the system model presented in Sec. II that allows the cognitive node to act as a ("transparent") relay for the primary link is described in more detail. More precisely, in one embodiment, the secondary node is allowed to forward packets of the primary user that have not been successfully received by the intended destination. In doing so, the system is designed so as not to violate the cognitive radio principle that prescribes secondary nodes to be "invisible" to the primary (see, for example, FIG. 5 for an illustration of the system). As explained earlier, one feature gained by adding relaying capability to the secondary transmitter 54 is the following. If the propagation channel from the primary transmitter 44 to the secondary transmitter 54 ($\gamma_{PS}$) is advantageous with respect to the direct channel $\gamma_P$, having packets relayed by the secondary 54 can help emptying the queue 42 of the primary 44. This creates transmitting opportunities for the secondary. It will be appreciated by one skilled in the art that the increased number of available slots for the cognitive node 54 has to be shared between transmission of own packets and relayed packets. Assessing the features (or benefits) of this modified structure is then not trivial and will be described in more detail below.

A. MAC Layer System Model with Relaying

Here, according to one embodiment, the MAC layer model presented in Sec. II is modified in order to account for the added relaying capability at the secondary node 54. The main assumptions (e.g., infinite buffers, slotted transmission, stationarity of the arrival processes, channel sensing by the secondary node with detection error probability $P_e$ in Equation (2)) are left unaltered. According to one embodiment, the only differences concern the transmission strategy of the cognitive node and details concerning the exchange of ACK/NACK messages. With reference to FIG. 5, the cognitive node 54 has two queues, queue 52 collecting its own packets ($Q_S(t)$) and queue 51 containing packets received by the primary transmitters to be relayed to the primary destination ($Q_{PS}(t)$). A packet transmitted by the primary node 44 can in fact be erroneously received by the intended destination, e.g., receiver 46, (that signals the event with a NACK message) but correctly received by the secondary transmitter 54 (that sends an ACK message). In this case, the primary source 44 drops the packet from its queue 42, as if correctly received by the destination 46, and the secondary 54 puts it in its queue 51 $Q_{PS}(t)$. (This a small deviation from the cognitive radio principle of transparency of the secondary user to the primary: in fact, because of the secondary activity, the primary might receive two acknowledgments for the same packet. Here, in one embodiment, it will simply consider the packet as correctly received if at least one acknowledgment is positive.) Here, if both primary destination 46 and secondary transmitter 54 correctly decode the signal, the secondary 54 does not include the latter in its queue (upon reception of the ACK message from the destination).

In one embodiment, whenever the secondary node 54 senses an idle slot (and it does so with error probability $P_e$ in Equation (2)), it transmits a packet from queue 51 $Q_{PS}(t)$ (primary's packets) with probability $\epsilon$ and from the second queue 52 $Q_S(t)$ (own packets) with probability $1-\epsilon$. Therefore, similarly to the case with no relaying, it is understood here that the secondary node 54 is able to select its transmission power $P_S \leq 1$ and the probability $\epsilon$ based on the statistics of the channels ($\gamma_P$, $\gamma_S$, $\gamma_{SP}$, $\gamma_{PS}$) and the system parameters ($\alpha$, $\beta_P$, $\beta_S$, $\lambda_P$) towards the following goals: (i) retaining the stability of the queue of the primary node ("transparency" of the cognitive node); (ii) maximizing its own stable throughput.

B. System Analysis

The primary user is oblivious to the activity of the secondary. Therefore, as in the case of no relaying, it selects an average rate in the range set forth in Equation (4) (see Sec. III(B) above). The maximum power $P_S$ that the cognitive node is allowed to transmit in order to guarantee stability of the queue of the primary is derived below.

Proposition 3: Given the channel parameters ($\gamma_P$, $\gamma_{PS}$, $\gamma_{SP}$) and system parameters ($\alpha$, $\beta_P$, $\lambda_P$):

if $\lambda_P < \mu_P^{max} \exp(-\alpha/\gamma_{PS}) + \Delta\mu_P$, with $$\Delta\mu_P = \exp\left(-\frac{\alpha + \beta_P}{\gamma_{PS}}\right)\left(1 - \exp\left(-\frac{\beta_P}{\gamma_P}\right)\right), \quad (10)$$

the secondary user can employ any power $P_S$ without affecting the stability of the queue of the primary node, and in particular $P_S$ can be set equal to its maximum, $P_S=1$;

if $\mu_P^{max} \exp(-\alpha/\gamma_{PS}) + \Delta\mu_P \leq \lambda_P < \mu_P^{max}$, the maximum power that the cognitive node can employ is $$P_S < \left(\frac{\mu_P^{max} + \Delta\mu_P - \lambda_P}{\lambda_P - \mu_P^{max}\exp\left(-\frac{\alpha}{\gamma_{PS}}\right) - \Delta\mu_P}\right)^{\gamma_P/\beta_P} \frac{1}{\gamma_{SP}}. \quad (11)$$

As in Sec. III, due to the interaction of the queues in the system, the concept of dominant system is utilized. In the embodiment shown in FIG. 5, the dominant system can be defined by the following modification to the original system. If $Q_{PS}(t)=0$ (or $Q_S(t)=0$), the secondary user continues to transmit "dummy" packets whenever it senses an idle channel and the first (or second queue) is selected, thus continuing to possibly interfere with the primary user whether its queues are empty or not. This will be described in more detail later.

As a direct consequence of Proposition 3, the secondary can employ its maximum power $P_S=1$ for $\lambda_P < \overline{\lambda}_P^{rel}$ where $$\overline{\lambda}_P^{rel} = \overline{\lambda}_P + \Delta\mu_P. \quad (12)$$

Thus, relaying enhances the average departure rate of the primary (by $\Delta\mu_P$), thus increasing the range of primary user throughputs at which the cognitive node is allowed to transmit at full power.

Similarly to the case of no relaying as described in Sec. III(D) above, the issue of finding the maximum stable throughput of the secondary $\mu_S$ reduces to an optimization over the transmitted power $P_S$ (under the constraint set by Proposition 3). However, the analysis here is complicated by the fact that, in one embodiment, the secondary node has the added degree of freedom of choosing the probability $\epsilon$ that discriminates which queue between queue 51 $Q_{PS}(t)$ and queue 52 $Q_S(t)$ is served. The main result is summarized in Proposition 4 that mirrors Proposition 3 for the case of no relaying.

Proposition 4: Given the channel parameters ($\gamma_P$, $\gamma_{PS}$, $\gamma_{SP}$, $\gamma_S$) and system parameters ($\alpha$, $\beta_P$, $\beta_S$, $\lambda_P$), under the assumption that the stability of the queue of the primary user is preserved ("transparency" of the cognitive node), the maximum stable throughput of the cognitive user is defined by the following optimization problem $$\max_{P_S} \mu_S(P_S) \quad (13)$$

$$\text{s.t.} \begin{cases} P_S \leq 1 & \text{if } \lambda_P \leq \overline{\lambda}_P^{rel} \\ P_S < \left(\frac{\mu_P^{max} + \Delta\mu_P - \lambda_P}{\lambda_P - \mu_P^{max}\exp\left(-\frac{\alpha}{\gamma_{PS}}\right) - \Delta\mu_P}\right)^{\gamma_P/\beta_P} \frac{1}{\gamma_{SP}} & \text{if } \lambda_P > \overline{\lambda}_P^{rel} \\ \varepsilon = \frac{\lambda_P\left(1 - \exp\left(-\frac{\beta_P}{\gamma_P}\right)\right)\exp\left(-\frac{\beta_P}{\gamma_{PS}}\right)}{(\mu_P^{rel}(P_S) - \lambda_P)\exp\left(-\frac{\beta_P}{\gamma_{SP}P_S}\right)} < 1 \end{cases}$$

where the throughput of the secondary link reads $$\mu_S(P_S) = \left[\frac{(\mu_P^{rel}(P_S) - \lambda_P)}{\mu_P^{rel}(P_S)}\exp\left(-\frac{\beta_P}{\gamma_{SP}P_S}\right) - \frac{\lambda_P}{\mu_P^{rel}(P_S)}\left(1 - \exp\left(-\frac{\beta_P}{\gamma_P}\right)\right)\exp\left(-\frac{\beta_P}{\gamma_{PS}}\right)\right]\exp\left(-\frac{\beta_S}{\gamma_S P_S} + \frac{\beta_P}{\gamma_{SP}P_S}\right), \quad (14)$$

which depends on the throughput of the primary:

$$\mu_P^{rel}(P_S) = \mu_P^{max} \cdot \frac{\gamma_P/\beta_P + \exp\left(-\frac{\alpha}{\gamma_{PS}}\right)\gamma_{SP}P_S}{\gamma_P/\beta_P + \gamma_{SP}P_S} + \Delta\mu_P. \quad (15)$$

Similar to Equation (8), this problem can be solved by using standard methods as described in Bertsekas. Similarly to Proposition 2, assuming a non-zero probability of false alarm $P_{fa}$ at the secondary (see Sec. II) results in a scaling of the achievable throughput $\mu_S(P_S)$ in Equation (14) by $(1-P_{fa})$.

In Equation (13), the first constraint limits the transmitted power, according to the results in Proposition 3, so as to ensure the stability of the queue of the primary $Q_P(t)$. On the other hand, the second constraint imposes that the probability $\epsilon$, needed to guarantee stability of the queue $Q_{PS}(t)$, is in fact a probability (the equality case is excluded since it would lead to $\mu_S=0$). Here, as opposed to the case of no relaying (see, for example, Proposition 2), the optimization problem (13) might not have feasible points for some $\lambda_P$ due to the constraint on the stability of $Q_{PS}(t)$, i.e., on $\epsilon$. For instance, assume that the probability of outage between primary transmitter and secondary transmitter $P_{out,PS}$ is much smaller than $P_{out,P}$ and, at the same time, the probability of outage between secondary transmitter and primary receiver $P_{out,SP}$ is large; in this case, it is apparent that most of the traffic passes through queue $Q_{PS}(t)$ that overflows due to the small departure rate towards the secondary receiver.

A possible solution to this problem could be to let the secondary transmitter accept only a fraction, say $0 \leq f \leq 1$ of the packets successfully received by the primary (and erroneously decoded at the intended destination). An optimization problem similar to (13) could be set up in this case, whereby the secondary has the degree of freedom of choosing power $P_S$ and probabilities $\epsilon$ and f.

C. Numerical Results

Figure 6A:
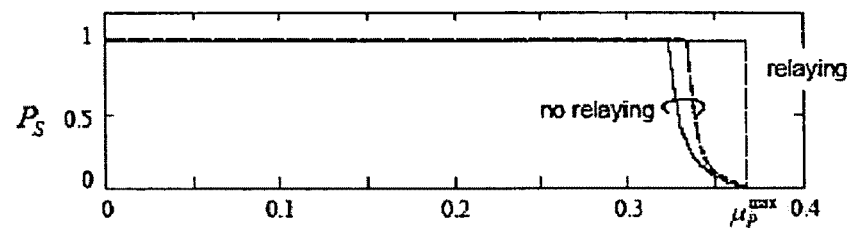
FIG. 6a is a graph showing a maximal power allowed to a secondary user versus an arrival rate to a primary user in the system configuration of FIG. 5.
Figure 6B:
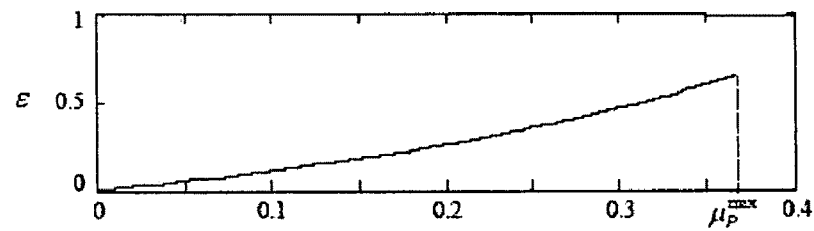
FIG. 6b is a graph showing a service probability of the secondary user versus the arrival rate to the primary user in the system configuration of FIG. 5.
Figure 6C:
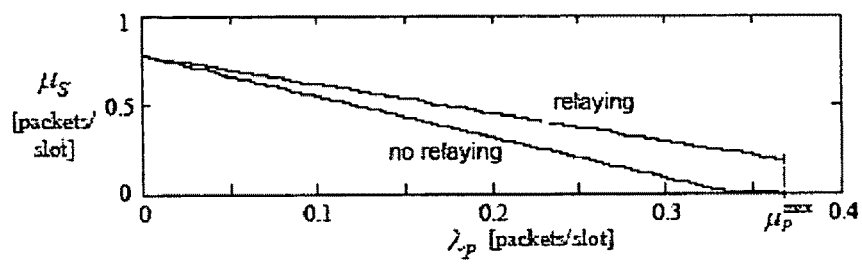
FIG. 6c is a graph showing a maximal throughput of the secondary user and the arrival rate to the primary user in the system configuration of FIG. 5.

The results in Proposition 4 are corroborated by FIGS. 6a, 6b, 6c and 7. FIGS. 6a, 6b and 6c show the optimal power $P_S$, the optimal probability $\epsilon$ and the maximum stable throughput $\mu_S$ obtained from Proposition 4 versus the throughput selected by the primary node $\lambda_P$. In one embodiment, parameters are selected as $\gamma_P=4$ dB, $\gamma_S=\gamma_{SP}=\gamma_{PS}=10$ dB and $\alpha=0$ dB, $\beta_P=\beta_S=4$ dB. Here, the average channel gain to and from the "relay" are 6 dB better than the direct primary link $\gamma_P$. The maximum rate for the primary is $\mu_P^{max}=0.37$ (see, for example, Equation (4)). FIG. 6a shows that, while in the non-relaying mode the cognitive node can transmit maximum power only up to around $\bar{\lambda}_P=0.34$ (see, for example, Equation (7)), in the relaying case the cognitive node can transmit at the maximum power in the whole range prescribed in Equation (4). Moreover, as shown in FIG. 6b, queue 51 $Q_{PS}(t)$ in this case is always stabilizable, i.e., the optimal probability $\epsilon$ resulting from Equation (13) is less than one in the range of interest. Finally, FIG. 6c compares the maximum throughput for the no-relaying case (Proposition 2) and for the relaying case (Proposition 1), showing the relevant advantages of relaying for sufficiently large $\lambda_P$.

Figure 7:
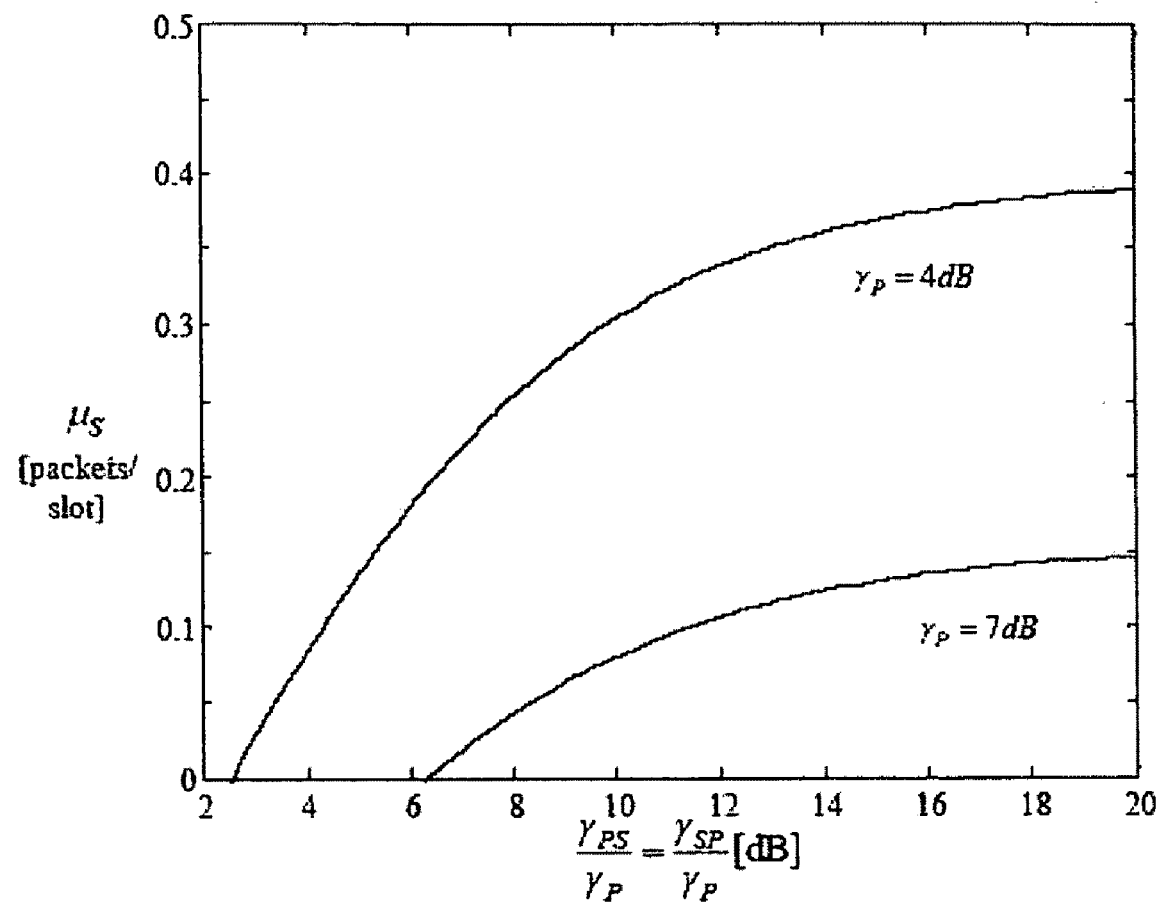
FIG. 7 is a graph showing a maximal throughput of the secondary user in the network configuration of FIG. 5.

The performance advantage of using relaying is further illustrated in FIG. 7, where the maximum throughput of the secondary user 54 $\mu_S$ is plotted for a fixed $\lambda_P=\mu_P^{max}$ (see Equation (4)) in the case of relaying. In more detail, $\lambda_P=\mu_P^{max}-\delta$ for an arbitrarily small $\delta>0$ since the average arrival rate is limited by the model to Equation (4). Here, for $\lambda_P=\mu_P^{max}$, the throughput of the cognitive node 54 with no relaying is zero and, therefore, the FIG. at hand measures the gain obtained by relaying (see also FIG. 6c). Where not stated otherwise, parameters are selected as in the example above. The FIG. shows that increasing (at the same rate) the quality of the channel to and from the cognitive node 54 ($\gamma_{SP}$ and $\gamma_{PS}$) with respect to $\gamma_P$ increases the gain of relaying, and that the advantage is more relevant if the direct channel gain is smaller (compare the two curves with $\gamma_P=4$ dB and 7 dB).

Moreover, the issue of feasibility and stability mentioned above is illustrated by FIG. 7. Whenever there is a good channel $\gamma_{PS}$ to the secondary transmitter 54 and a weak direct channel $\gamma_P$, most of the traffic is redirected to the secondary. On one hand, this helps increasing the available slots for transmission by the secondary. On the other hand, if not supported by a sufficiently good channel from the secondary transmitter 54 to the primary destination 46, $\gamma_{SP}$, the secondary is not able to deliver the extra traffic coming from the primary. Therefore, the optimization problem (13) does not have any feasible solution, and the throughput of the secondary node is zero. A solution to this problem could be the implementation of the technique explained above, whereby the secondary only accepts a fraction of packets from the primary.

As described herein, a cognitive interference channel, comprising one licensed (primary) link and one unlicensed (secondary or cognitive) link, has been studied in a stationary fading environment. The activity of the secondary link has been considered "transparent" to the primary if it does not affect stability of the queue of the latter. Under this understanding and considering power allocation at the secondary transmitter, unavoidable errors in sensing the activity of the primary link have been shown to limit the maximum stable throughput achievable by the secondary link. To alleviate this problem, in exemplary embodiments, a modification of the original cognitive interference channel has been proposed, where the secondary transmitter acts as a "transparent" relay for the traffic of the primary. Numerical results show that the advantages of such a solution (may) depend on the topology of the network.

While the exemplary embodiments illustrated in the Figures and described above are presently preferred, it should be understood that these embodiments are offered by way of example only. The invention is not limited to a particular embodiment, but extends to various modifications, combinations, and permutations that nevertheless fall within the scope and spirit of the appended claims.

VI. Appendix

A. Further Details Regarding Proposition 1

The queue size (in packets) of the primary evolves as $Q_P(t)=(Q_P(t-1)-X_P(t))^+ +Y_P(t)$, where $Y_P(t)$ is the stationary process representing the number of arrivals in slot t ($E[Y_P(t)]=\lambda_P$), and $X_P(t)$ is the departure process (to be proved to be stationary). Function $(\ )^+$ is defined as $(x)^+=\max(x,0)$. By exploiting the definition of dominant system and recalling that an outage requires retransmission, the departure process can be written as:

$$X_P(t)=1\{O_D(t) \cap O_P(t)\}+1\{O_D^c(t) \cap O'_P(t)\}, \quad (16)$$

where $1\{\cdot\}$ is the indicator function of the event enclosed in the brackets; $O_D(t)$ denotes the event that the cognitive node correctly identifies the ongoing activity of the primary user (and so it does not interfere), which happens with probability $1-P_e$ (see Equation (2)); $O_P(t)$ represents the event of a successful transmission by the primary user (assuming that the secondary does not interfere), which happens with probability $1-P_{out,P}$ (see Equation (1)); $O_D^c(t)$ is the complement of $O_D(t)$; $O'_P(t)$ represents the event of a successful transmission by the primary user, assuming that the secondary interferes which has probability $1-P'_{out,P}$ (see Equation (19) below). Since all the events in Equation (16) only depend on the stationary channel process, the departure process $X_P(t)$ is stationary with mean given by $\mu_P(P_S)=E[X_P(t)]=(1-P_e)\mu_P^{max}+P_e(1-P'_{out,P})$ (see also Luo et al. for a similar analysis). After substituting eqns. (1), (2) and (19), the average departure rate results in $$\mu_P(P_S) = \mu_P^{max} \cdot \frac{\gamma_P/\beta_P + \exp\left(-\frac{\alpha}{\gamma_P}\right)\gamma_{SP}P_S}{\gamma_P/\beta_P + \gamma_{SP}P_S}. \quad (17)$$

From stationarity of the processes involved, it can be concluded that the primary queue is stable as long as $\mu_P(P_S)>\lambda_P$ (Loynes' theorem). For a given selected value of $\lambda_P$, this imposes a limitation on the power that the secondary user can employ, as stated in Proposition 1.

B. Derivation of $P'_{out}$

In case the transmission of the primary user is interfered by the cognitive transmitter, the signal-to-interference-plus-noise ratio (SINR) at the primary receiver reads:

$$SINR_P = \frac{\gamma_P|h_P|^2}{1+\gamma_{SP}|h_{SP}|^2 P_S} = \frac{\gamma_P}{\gamma_{SP}P_S} \frac{|h_P|^2}{\frac{1}{\gamma_{SP}P_S}+|h_{SP}|^2}. \quad (18)$$

Using the results of M. Sharif and B. Hassibi, "On the capacity of MIMO broadcast channels with partial side information," IEEE Trans. Inform. Theory, vol. 51, no. 2, pp. 506-522, February 2005, the entire content of which is incorporated herein by reference (namely, Equation (15)) the cumulative distribution function is evaluated as:

$$P[SINR_P<x]=P'_{out,P}=1-\frac{\exp\left(-x\frac{1}{\gamma_P}\right)}{1+x\frac{\gamma_{SP}P_S}{\gamma_P}}. \quad (19)$$

C. Further Details Regarding Proposition 2

The queue size (in packets) at the secondary node evolves as $Q_S(t)=(Q_S(t-1)-X_S(t))^+ + Y_S(t)$, where $Y_S(t)$ is the stationary process representing the number of arrivals in slot t ($E[Y_S(t)]=\lambda_S$), and $X_S(t)$ is the departure process (to be proved to be stationary). The latter can be expressed as $X_S(t)=1\{A_S(t) \cap O_S(t)\}$, where $O_S(t)$ is the event of a successful transmission by the secondary user (to its own receiver), whose probability is $1-P_{out,S}$ (see Equation (1)); $A_S(t)$ denotes the event that slot t is available for transmission by the cognitive node. Since the queue of the primary user is stationary by construction, the slot availability process for the cognitive node (defined by $A_S(t)$) is stationary (see Rao et al.). Moreover, due to the considered MAC model, the probability of availability corresponds to the probability of having zero packets in the queue of the primary user (Little's theorem, as described in D. Bertsekas and R. Gallager, Data networks, Prentice-Hall 1987, the entire content of which is incorporated herein by reference):

$$P[A_S(t)] = P[Q_P(t)=0] = 1 - \frac{\lambda_P}{\mu_P(P_S)}. \quad (20)$$

As such, $X_S(t)$ is stationary with average $$\mu_S(P_S)=E[X_S(t)]=P[Q_P(t)=0]\cdot(1-P_{out,S}), \quad (21)$$

and, using the Loynes' theorem, the stable throughput for the secondary node is limited by the condition $\lambda_S<\mu_S(P_S)$. The last expression clearly shows the trade-off in the choice of the transmitted power $P_S$ that was discussed above. In fact, based on eqns. (1) and (17), the two terms in Equation (21) depend on the transmission power $P_S$ in opposite ways, the first decreasing and the second increasing for increasing $P_S$. By plugging eqns. (20), (1) and (17) in Equation (21), algebraic computations result in Equation (9), which is shown to be concave in $P_S$. Having shown the stationarity of the involved processes, Proposition 2 is a direct consequence of Proposition 1 and Loynes' theorem.

D. Further Details Regarding Proposition 3

The departure rate $X_P(t)$ of the primary queue satisfies $X_P(t)=1\{O_D(t) \cap O''_P(t)\}+1\{O_D^c(t) \cap O'_P(t)\}$, where $O''_P(t)$ represents the event of a successful transmission by the primary user, assuming that the secondary does not interfere, which now happens with probability $1-P''_{out,P}$, where $$P''_{out,P} = 1 - \left[\exp\left(-\frac{\beta_P}{\gamma_P}\right) + \exp\left(-\frac{\beta_P}{\gamma_{PS}}\right) - \exp\left(-\frac{\beta_P}{\gamma_P}-\frac{\beta_P}{\gamma_{PS}}\right)\right]. \quad (22)$$

The outage probability of Equation (22) differs from the case of no relaying (see Equation (1)) in that here transmission by the primary node is considered successful when the packet is correctly received either by the intended destination (with probability $\exp(-\beta_P/\gamma_P)$) or by cognitive node (with probability $\exp(-\beta_P/\gamma_{PS})$). Accordingly, $X_P(t)$ is a stationary process with mean $$\mu_P^{rel}(P_S)=E[X_P(t)]=(1-P_e)(1-P''_{out,P})+P_e(1-P'_{out,P}). \quad (23)$$

By using Equation (22) in Equation (23), it is found that the average departure rate at the primary in the considered relaying scenario reads as Equation (15), having defined $\Delta\mu_P$ as in Equation (10). Comparing Equation (15) with $\mu_P(P_S)$ in Equation (17), we conclude that cooperation leads to an additive increase of the throughput of the primary user which is independent of $P_S$. Here, the latter condition reflects the fact that the delivery rate $\mu_P^{rel}(P_S)$ measures the packets departing from the primary, not the traffic actually relayed to the destination. From the discussion above, Proposition 3 follows.

E. Further Details Regarding Proposition 4

The first queue size $Q_{PS}(t)$ evolves as $Q_{PS}(t)=(Q_{PS}(t-1)-X_{PS}(t))^+ + Y_{PS}(t)$, where the arrival rate $Y_{PS}(t)$ can be written as $Y_{PS}(t)=1\{\{Q_P(t)\neq 0\} \cap O_P^c(t)(t) \cap O_{PS}(t)\}$. Following the notation in Sec. III(D), $O_{PS}(t)$ denotes the event of a successful reception of a packet transmitted by the primary transmitter at the secondary transmitter, which has probability $1-P_{out,PS}=\exp(-\beta_P/\gamma_{PS})$. From the stationarity of the fading processes and stability of the queue of the primary user, the arrival process $Y_{PS}(t)$ is stationary with mean $$\lambda_{PS} = \frac{\lambda_P}{\mu_P^{rel}(P_S)} \cdot P_{out,P} \cdot (1-P_{out,PS}), \quad (24)$$

where Little's theorem (see Equation (20)) is applied. Here, in deriving Equation (24), it is understood that $\alpha<\beta_P$ (see Sec. II). On the other hand, the departure process is $X_{PS}(t)=1\{A_{PS}(t) \cap O_{SP}(t)\}$, with $A_{PS}(t)$ denoting the event that the t th time slot is available for transmission by the first queue of the secondary, which happens with probability $P[Q_P(t)=0]\cdot\epsilon$;

$O_{SP}(t)$ being the event of successful reception from the primary destination of a packet transmitted by the secondary node, which has probability $1-P_{out,SP}=\exp(-\beta_P/(\gamma_{SP}P_S))$. Therefore, the departure process $X_{PS}(t)$ is stationary and its mean reads $$\mu_{PS}(P_S,\epsilon)=E[X_{PS}(t)]=P[Q_P(t)=0]\cdot(1-P_{out,SP})\cdot\epsilon. \quad (25)$$

Stability of queue $Q_{PS}(t)$ is guaranteed if the condition $\lambda_{PS}<\mu_{PS}(P_S,\epsilon)$ holds (Loynes' theorem), which in turn from Equations (24) and (25) entails the following condition on $\epsilon$ and $P_S$:

$$\varepsilon > \frac{\lambda_P\left(1 - \exp\left(-\frac{\beta_P}{\gamma_P}\right)\right)\exp\left(-\frac{\beta_P}{\gamma_{PS}}\right)}{(\mu_P^{rel}(P_S) - \lambda_P)\exp\left(-\frac{\beta_P}{\gamma_{SP}P_S}\right)}. \quad (26)$$

The departure process $X_S(t)$ is stationary with mean $$\mu_S(P_S, \varepsilon) = E[X_S(t)] = P[Q_P(t) = 0]\cdot(1 - P_{out,S})\cdot(1 - \varepsilon) = \quad (27)$$
$$= \left(1 - \frac{\lambda_P}{\mu_P^{rel}(P_S)}\right)\exp\left(-\frac{\beta_S}{\gamma_S P_S}\right)(1 - \varepsilon).$$

Optimizing the stable throughput of the cognitive node amounts to maximizing $\mu_S(P_S,\epsilon)$ with respect to $\epsilon$ and $P_S$ since from the Loynes' theorem $\lambda_S<\mu_S(P_S,\epsilon)$. The maximum achievable throughput $\mu_S(P_S,\epsilon)$ (27) is a decreasing function of $\epsilon$. Therefore, in order to maximize $\mu_S(P_S,\epsilon)$, $\epsilon$ is set equal to its minimum value (see Equation (26)), thus obtaining $\lambda_S<\mu_S(P_S)$, where $\mu_S(P_S)$ is in Equation (14). From the discussion above, Proposition 4 follows.

What is claimed is:

1. A cognitive radio system comprising:
   a first transmitter configured to receive a plurality of first packets and to transmit the first packets to a first receiver via a wireless channel; and
   a second transmitter configured to:
   receive a plurality of second packets;
   receive the plurality of the first packets from the first transmitter; and
   detect an idle state of the wireless channel, wherein, upon detecting the idle state of the wireless channel, the second transmitter is configured to select between transmitting at least one of the second packets to a second receiver and relaying at least one of the first packets to the first receiver, and configured to transmit the at least one of the second packets to the second receiver or relay the at least one of the first packets to the first receiver based on the selecting, wherein the selecting is based on a detected state of a transmission of the at least one of the first packets to the first receiver from the first transmitter.

2. The system of claim 1, wherein the second transmitter is configured to relay the at least one of the first packets if the transmission of the at least one of the first packets to the first receiver from the first transmitter is detected to be unsuccessful.

3. The system of claim 1, wherein the second transmitter is configured to refrain from relaying the at least one of the first packets if the transmission of the at least one of the first packets to the first receiver from the first transmitter is detected to be successful.

4. The system of claim 1, wherein the first transmitter is configured to acknowledge an acceptance of the at least one of the first packets by the second transmitter.

5. The system of claim 4, wherein, after the first transmitter has transmitted the at least one of the first packets, the first transmitter is configured to refrain from re-transmitting the at least one of the first packets if the transmission of the at least one of the first packets is detected to be unsuccessful and the first transmitter has acknowledged the acceptance of the at least one of the first packets by the second transmitter.

6. The system of claim 1,
   wherein the second transmitter has a transmission power, and
   wherein the second transmitter is configured to ensure a service stability of the first transmitter by controlling the transmission power.

7. The system of claim 1, wherein the second transmitter is configured to ensure a service stability of the first transmitter in selectively transmitting the at least one of the second packets to the second receiver or relaying the at least one of the first packets to the first receiver.

8. The system of claim 1, wherein the first transmitter corresponds to a licensed user of the channel and the second transmitter corresponds to an unlicensed user of the channel.

9. A method of operating a cognitive radio system, the method comprising:
   directing a plurality of first packets to a first transmitter for transmission to a first receiver over a wireless channel, and to a second transmitter;
   directing a plurality of second packets to the second transmitter for transmission to a second receiver over the channel;
   transmitting at least one of the first packets from the first transmitter to the first receiver;
   detecting at the second transmitter an idle state of the channel; and upon the detection of the idle state of the channel, selecting between transmitting at least one of the second packets from the second transmitter to the second receiver and relaying at least one of the first packets from the second transmitter to the first receiver, and transmitting the at least one of the second packets from the second transmitter to the second receiver or relaying the at least one of the first packets from the second transmitter to the first receiver based on the selecting, wherein the selecting is based upon a detected state of a transmission of the at least one of the first packets to the first receiver.

10. The method of claim 9, wherein the first transmitter corresponds to a licensed user of the channel and the second transmitter corresponds to an unlicensed user of the channel.

11. A radio system having at least two single-user communication links, a first link being licensed to use a spectral resource and a second link being unlicensed, the system comprising:
   a first receiver in communication with a first transmitter through a communication channel, wherein the first receiver is configured to receive first packets; and
   a second receiver coupled to a second transmitter by the communication channel, wherein, upon detecting an idle state of the communication channel, the second transmitter selects between transmitting second packets to the second receiver and relaying at least one of the first packets to the first receiver, and transmits the second packets to the second receiver or relays the at least one of the first packets to the first receiver based on the selecting, wherein the selecting is based upon a detected state of a transmission of the at least one of the first packets to the first receiver.

12. The system of claim 11, wherein the second transmitter relays the at least one of the first packets to the first receiver if the transmission of the at least one of the first packets to the first receiver by the first transmitter is detected to be unsuccessful.

13. The system of claim 11, wherein the second transmitter controls transmission power.

14. The system of claim 11, wherein the first transmitter is a licensed user of the communication channel and the second transmitter is an unlicensed user of the communication channel.

15. The system of claim 11, wherein the second transmitter derives a maximum stable throughput for the communication channel.

16. The system of claim 11, wherein the first receiver detects random packet arrivals.

17. The system of claim 11, wherein the second transmitter senses errors due to fading in the communication channel.

18. The system of claim 17, wherein, upon detection of fading in the communication channel, the second transmitter relays the at least one of the first packets to the first receiver.

* * * * *

UNITED STATES PATENT AND TRADEMARK OFFICE
CERTIFICATE OF CORRECTION

PATENT NO.         : 8,144,723 B2
APPLICATION NO.    : 12/001480
DATED              : March 27, 2012
INVENTOR(S)        : Bar-Ness et al.

It is certified that error appears in the above-identified patent and that said Letters Patent is hereby corrected as shown below:

On Title Page 2, in Field (56), under "OTHER PUBLICATIONS", in Column 2, Line 4, delete "Sharif" and insert -- M. Sharif --, therefor.

On Title Page 2, in Field (56), under "OTHER PUBLICATIONS", in Column 2, Line 21, delete "Jovičićand" and insert -- Jovičić and --, therefor.

In Column 5, Line 52, delete "$\lfloor h_i(t) \rvert^2$" and insert -- $|h_i(t)|^2$ --, therefor.

In Column 8, Line 7, delete "$\lambda_P/\mu_P^{max}$" and insert -- $\lambda_P/\mu_P^{max}$, --, therefor.

In Column 9, Line 27, delete "$\gamma_P=10$," and insert -- $\gamma_{SP}=10$, --, therefor.

In Column 9, Line 57, delete "node:" and insert -- node. --, therefor.

In Column 10, Line 6, in Equation (8), delete "$\exp\left(-\frac{\beta_P}{\lambda_P}\right) - \lambda_P$" and insert -- $\exp\left(-\frac{\beta_P}{\gamma_P}\right) - \lambda_P$ --, therefor.

In Column 11, Line 42, delete "$P_S<1$" and insert -- $P_S\leq 1$ --, therefor.

In Column 11, Line 57, delete "$\Delta\mu_P$," and insert -- $\Delta\mu_P$ --, therefor.

Signed and Sealed this
Fourteenth Day of August, 2012

David J. Kappos
*Director of the United States Patent and Trademark Office*